United States Patent
Feil et al.

(10) Patent No.: US 10,716,180 B2
(45) Date of Patent: Jul. 14, 2020

(54) LAMP WITH A YELLOW AND WITH A WHITE AND/OR BLUE LIGHT SOURCE GROUP

(71) Applicant: OSRAM GmbH, Munich (DE)

(72) Inventors: Thomas Feil, Iggingen (DE); Daniel Weissenberger, Giengen (DE); Martin Petzold, Ellwangen (DE)

(73) Assignee: OSRAM Beteiligungsverwaltung GmbH, Günwald (DE)

( * ) Notice: Subject to any disclaimer, the term of this patent is extended or adjusted under 35 U.S.C. 154(b) by 0 days.

(21) Appl. No.: 16/153,872

(22) Filed: Oct. 8, 2018

(65) Prior Publication Data
US 2019/0110348 A1   Apr. 11, 2019

(30) Foreign Application Priority Data

Oct. 9, 2017 (DE) .......... 10 2017 217 897

(51) Int. Cl.
| | |
|---|---|
| *F21S 41/141* | (2018.01) |
| *F21S 41/19* | (2018.01) |
| *H05B 33/08* | (2020.01) |
| *H05B 45/20* | (2020.01) |
| *H05B 45/10* | (2020.01) |
| *F21Y 113/13* | (2016.01) |
| *F21V 29/70* | (2015.01) |
| *F21Y 115/10* | (2016.01) |

(52) U.S. Cl.
CPC ............ *H05B 45/20* (2020.01); *F21S 41/141* (2018.01); *F21S 41/194* (2018.01); *H05B 45/10* (2020.01); *F21V 29/70* (2015.01); *F21Y 2113/13* (2016.08); *F21Y 2115/10* (2016.08)

(58) Field of Classification Search
CPC .... B60Q 1/46; B60Q 1/34; F21S 41/00; F21S 41/141; F21S 41/125; F21S 41/153
See application file for complete search history.

(56) References Cited

U.S. PATENT DOCUMENTS

| | | | |
|---|---|---|---|
| 9,840,191 B1 * | 12/2017 | Salter .................... | B60Q 1/2661 |
| 2004/0027834 A1 * | 2/2004 | Chigusa ................. | B60Q 1/085 |
| | | | 362/511 |
| 2006/0274544 A1 * | 12/2006 | Inoue .................... | B60Q 1/0023 |
| | | | 362/509 |

(Continued)

FOREIGN PATENT DOCUMENTS

| | | |
|---|---|---|
| DE | 103 47 463 A1 | 4/2005 |
| DE | 10 2010 056 313 A1 | 6/2012 |

(Continued)

OTHER PUBLICATIONS

German Search Report based on 10 2017 217 897.3 (7 pages) dated Jun. 5, 2018 (for reference purpose only).

*Primary Examiner* — Alexander K Garlen
*Assistant Examiner* — Eric T Eide
(74) *Attorney, Agent, or Firm* — Edward S. Podszus (57) ABSTRACT

A lamp for a headlamp is provided. The lamp includes at least two light source groups each including at least one controllable light source. The light sources of one light source group are set up for emitting yellow light. The light sources of another light source group are set up for emitting at least one of white or blue light. At least the light sources of the at least two light source groups are arranged for producing light that is collectively emittable.

17 Claims, 3 Drawing Sheets

(56) References Cited

U.S. PATENT DOCUMENTS

| | | | |
|---|---|---|---|
| 2008/0055896 A1* | 3/2008 | Feldmeier | H05B 33/0872 362/231 |
| 2012/0161633 A1* | 6/2012 | Nishitani | F21V 23/007 315/117 |
| 2013/0058114 A1* | 3/2013 | Reiners | F21S 41/16 362/510 |
| 2015/0049504 A1* | 2/2015 | Wu | F21S 41/19 362/517 |
| 2016/0121782 A1* | 5/2016 | Soenen | F21S 41/24 362/511 |
| 2016/0169471 A1* | 6/2016 | Saito | B60Q 1/0023 362/464 |
| 2017/0027038 A1 | 1/2017 | Friedrich | |

FOREIGN PATENT DOCUMENTS

| | | |
|---|---|---|
| DE | 10 2012 017 596 A1 | 3/2014 |
| DE | 20 2014 002 809 U1 | 5/2014 |
| DE | 10 2013 221 743 A1 | 4/2015 |
| DE | 10 2015 206 471 A1 | 10/2016 |
| DE | 10 2015 213 552 A1 | 1/2017 |
| DE | 10 2015 214 090 A1 | 1/2017 |
| WO | 2011/144 236 A1 | 11/2011 |
| WO | 2015/149 973 A1 | 10/2015 |

\* cited by examiner

LAMP WITH A YELLOW AND WITH A WHITE AND/OR BLUE LIGHT SOURCE GROUP

CROSS-REFERENCE TO RELATED APPLICATION

This application claims priority to German Patent Application Serial No. 10 2017 217 897.3, which was filed Oct. 9, 2017, and is incorporated herein by reference in its entirety.

TECHNICAL FIELD

Various embodiments relate generally to a lamp for a headlamp.

BACKGROUND

In conventional headlamps, standardizations may apply, such as for example standardizations by the International Technical Commission (IEC). Among them, for example, standards for a halogen lamp, for a discharge lamp, for an LED lamp, for an LED retrofit lamp (LED replacement lamp), specifically also for an "LED exchangeable light source (LED-XLS)" may be provided. Such a light source can be used, for example, for an additional light function in a vehicle, such as a fog light function, daytime running light function, low-beam function, high-beam function, tail light function, signal light function, position light function, turn light function, brake light function, accent illumination function, effect light-emitting means, and for further, non-automotive applications, e.g. as light-emitting means in projectors for effect light illumination, entertainment illumination, architainment illumination, outdoor illumination, offshore illumination, illumination for wind turbines, ambient illumination, medical and therapeutic illumination or illumination for horticulture or animal husbandry. For example, the standardization can relate to referencing and rotation locking of the light source in the headlamp (or projector) and to a light color, a luminous flux, a luminance, reliability of operation in a defined temperature range, such as from minus 40° C. to plus 125° C.

A conventional illumination device has a semiconductor light source arrangement that is arranged on a carrier, a housing for receiving the semiconductor light source arrangement, a heat sink for cooling the semiconductor light source arrangement, and an electrical connection element for supplying the semiconductor light source arrangement with energy, wherein the heat sink has a heat sink portion that is arranged in a cutout of the housing and forms a placement surface for the carrier of the semiconductor light source arrangement, wherein the heat sink furthermore has a second heat sink portion, which is arranged with an accurate fit between the housing and the electrical connection element, and wherein furthermore the electrical connection element has electrical contacts that are guided through a perforation in the placement surface and form a press fit with the carrier of the semiconductor light source arrangement. Arranged on the housing are here preferably locking elements that serve to form bayonet locking with a socket. Likewise with preference, a sealing ring is provided, which is arranged in a receptacle of the housing. In this respect, reference is also made to the disclosure of WO 2015/149 973 A1.

Another conventional illumination device has a plurality of semiconductor light sources, which are arranged on a surface of a carrier, and a common optical unit for the semiconductor light sources, which covers the semiconductor light sources, characterized in that the common optical unit is configured to be rotationally symmetric with respect to an axis of symmetry that is perpendicular to the surface of the carrier and the semiconductor light sources are arranged on the carrier symmetrically with respect to the axis of symmetry. The illumination device here preferably has, in addition to an assembly circuit board which serves as the carrier, inter alia a housing and a heat sink. The heat sink preferably has a hollow-cylindrically shaped heat sink portion, which is arranged in a cutout, that is to say ring opening, of the housing, and a planar placement surface for the assembly circuit board on its side facing the (first) end face of the housing. At its second end side, the ring-shaped housing preferably has a ring-shaped flange portion which protrudes radially outwardly from an outer lateral surface of the ring-shaped housing, forms a placement surface for a sealing ring and together with locking elements constitutes a ring-shaped groove for receiving the sealing ring made of silicone or rubber. The for example three locking elements are preferably arranged along the outer circumference of the ring-disk-shaped first end surface and protrude radially from the outer lateral surface of the ring-shaped housing and form a bayonet lock with correspondingly shaped counterpieces of a socket of a motor vehicle lamp. To activate the bayonet lock, the illumination device is preferably inserted into the socket of the motor vehicle lamp and subsequently rotated clockwise about the ring axis of the housing. To limit said rotational movement, a locking element preferably has a stop, which rests in the socket or installation opening of the motor vehicle lamp after the bayonet lock. The bayonet lock can be embodied with a product-specific key, such that each type of illumination device has its own key and mixups are thus avoided. The necessary contact pressure of the illumination device with respect to the socket is preferably provided by the sealing ring. The sealing ring can be formed for example in the form of an O-ring having a radially internally molded centering lip.

Yet another conventional illumination device for a motor vehicle is provided, wherein the illumination device has at least one semiconductor light source arrangement and means for regulating or controlling the supply current for the at least one semiconductor light source arrangement, wherein the means include at least one resistor element having a temperature-dependent resistance value.

SUMMARY

A lamp for a headlamp is provided. The lamp includes at least two light source groups each including at least one controllable light source. The light sources of one light source group are set up for emitting yellow light. The light sources of another light source group are set up for emitting at least one of white or blue light. At least the light sources of the at least two light source groups are arranged for producing light that is collectively emittable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Various embodiments convert ECE-conforming and non-ECE-conforming headlamp functions for serial use.

Various embodiments provide a lamp having at least two light source groups each including at least one controllable light source, wherein the light sources of one light source group are set up for emitting yellow light, and wherein the light sources of another light source group are set up for emitting white and/or blue light, wherein at least the light sources of the at least two light source groups are arranged for producing light that is collectively emittable. Due to the fact that white and/or blue light and also yellow light is emittable in a controllable fashion, a color point of light that is collectively emitted can be set. In this way, a reproducibly same light can be attained, as a result of which serial use can be easily achieved even with narrow tolerance requirements of comparable lamps. The lamp can consequently be used as a driving direction indicator lamp and also as a daytime running light lamp, position light lamp and/or the like. The color yellow may also technically be referred to as amber.

The light source can in various embodiments take the form of a light-emitting diode (LED). A light-emitting diode is in various embodiments intended to mean an LED having a downstream light-emitting substance for partially converting primary light (emission light of the LED) into secondary light (conversion light of the light-emitting substance); a warm-white light-emitting LED; a cold-white light-emitting LED; a blue-light-emitting LED; a yellow-light-emitting LED; an LED directly emitting yellow light; an LED emitting yellow conversion light; an LED operated in full conversion; an LED without a downstream light-emitting substance; a pixelated LED matrix arrangement; an organic LED (OLED) and/or the like. The LED chips preferably emit white light in the standardized ECE white field of the automotive industry, for example realized by way of a blue emitter and a yellow/green converter. An LED can also be an LED lamp for vehicle applications, such as the OSRAM XLS LED lamp (as is described for example in DE 20 2014 002 809 U1).

In various embodiments, a yellow-light-emitting LED may include a converter and an excitation light source. In this technology, the converter or the conversion element that is arranged at a distance from the excitation light source, also referred to as the radiation source, and has, or consists of, a phosphor is irradiated by excitation radiation, in various embodiments a blue excitation beam or pump beam or pump laser beam, e.g. by the excitation beam of a semiconductor diode. The excitation radiation is at least partly absorbed by the phosphor and at least partly converted into conversion radiation or into conversion light, the wavelengths of which and hence the spectral properties and/or color of which are determined by the conversion properties of the phosphor. In the case of down conversion, the excitation radiation of the radiation source is converted by the irradiated phosphor into conversion radiation having longer wavelengths than the excitation radiation. By way of example, this allows the conversion element to convert blue excitation radiation, e.g. blue excitation light, into red and/or green and/or (in the present case preferred) yellow conversion radiation. In the case of a partial conversion, white used light is produced, for example, from a superposition of non-converted blue excitation light and yellow conversion light. The light sources, set up for emitting white and/or blue light, of a light source group can be e.g. white-light-emitting light sources, blue-light-emitting light sources and/or a combination thereof.

The light source may also include a halogen retrofit LED lamp and the like.

The light source may include a pixelated light source, such as a pixelated LED, for example an OSRAM EVIYOS COB Matrix light source, or generally a light source or light-emitting means with a matrix arrangement.

It is e.g. possible to provide individual light sources of different sizes, with the result that for example a difference in efficiency between the light source groups can be compensated for.

A light source group may include light sources of different light source types or designs or configurations and/or light sources of at least one light source type or at least one design or at least one configuration and/or light sources of one light source type or one design or one configuration. A light source group may include light sources that emit only one color in each case, and/or light sources that emit only one color collectively, and/or light sources which emit only the same color. A color can come about in this case for example due to a wavelength and/or due to a mixture of a plurality of wavelengths.

If the light sources are individually controllable, the color point can be set particularly finely.

If the light sources are controllable in a subset, it is possible to achieve an efficient compromise between complexity and fine-setting of a color point.

If the light sources are controllable together, a particularly simple and cost-effective lamp can be obtained.

If the light sources are controllable via feedback, a deviation from a predetermined value can be detected and be compensated for as far as is technically possible. Instead of the term feedback, the term recirculation or the term closed-loop control can be used.

If the light sources are controllable by way of a light-source-individual value, a particularly precise control result can be attained. In various embodiments, for one of the controllable light sources and/or a multiplicity of the controllable light sources and/or each of the controllable light sources of at least the at least two light source groups, a corresponding value is used. The latter can be ascertained in advance, or it can be ascertained periodically or continuously, depending on the technical requirements and/or economic considerations.

If the light sources are controllable by way of a light-source-type value, a peculiarity of a light source type used can be taken into account in a general and efficient manner. A light source type can be understood to mean a color-related property, a design-related property, a construction-section-related property, a production-process-related property, a manufacturer-related property, a calculated property, a simulated property, a measured property and/or a property which is extrapolated from a random sample.

If the light sources are directly controllable, a particularly quick reaction is attained.

If a controllable light source includes at least two dimmable light sources having different color temperature, for example a blue-emitting and a yellow-emitting LED light source or for example a white-emitting and a yellow-emitting LED light source, the color point of the light which is emitted by the lamp can be selected on the straight line between the color point of the white and/or blue light source and the color point of the yellow light source in the CIE color space. It is possible hereby to simplify and/or reduce and/or omit binning, that is to say color-point sorting of the light sources, in a cost-saving manner with respect to the outlay and/or the fineness.

If a device for pulse width modulation is provided for dimming purposes, it is possible if using a semiconductor light source, such as an LED, to dim in a color-point-appropriate fashion. If a device for changing the current or current strength is provided for dimming purposes, dimming can be effected not only in a structurally simple fashion but also efficiently when a semiconductor light source is used. Both dimmer technologies have the same effects that they have proven themselves and are competently used to reliably achieve the admissibility requirements of a serial product.

It should be noted with respect to the aforementioned term "subset" that a subset of the light sources can be a subset of all light sources in order to realize a particularly efficient control of the lamp. A subset of the light sources can be a subset of the light sources of the at least two light source groups in order to particularly selectively control the lamp. A subset of the light sources can be a subset of a light source group, for example in order to attain a high control quality by way of a control object which is as homogeneous as possible. A subset of the light sources can be a predetermined subset, such as a constructively predetermined subset or a subset which is predetermined by way of non-volatile storage information, in order to keep the circuitry complexity low. A subset of the light sources can be a variable subset in order to obtain situation-adaptable control. A subset of the light sources can be a spatially determinable subset in order to obtain light which is perceivable as being uniform. A subset of the light sources can be in each case a light source from the at least two light source groups in order to keep a mixture ratio constant. A subset of the light sources can be a multiple thereof and/or a combination thereof in order to obtain an application-adaptable lamp. Instead of the term subset, the term subgroup can be used, without necessarily implying a limitation to a subset of a light source group.

If the light sources of the at least two light source groups are at least partially and/or regionally and/or sectionally offset and/or arranged with respect to one another, an optically uniformly acting alternating of the light sources can be attained. This is based on the fact that, first, not all light sources emit uniformly densely in all directions and, secondly, some output coupling optical units do not output uniformly, such as for example motor vehicle front headlamps frequently having an output coupling means which is subdivided into differently emitting regions. In order to achieve uniform light overall—even in the case of a dimming transition between the two colors along a straight line in the CIE color triangle—an ordered light source arrangement and/or light source distribution can be advantageous, the order of which corresponds to an order of an optical unit which is connected downstream, for example. The light sources can in this case be arranged mirror-symmetrically and/or rotation-symmetrically and/or asymmetrically and/or with a linear offset and/or with a functional offset and/or with a concentric offset and/or with an angle offset. A functionally offset arrangement can be understood to mean an offset which follows a mathematical function, for example a logarithmic, exponential and/or polynomial offset with respect to a point of reference. One example is being logarithmically offset with respect to a distance from a point of reference. A multiple of the aforementioned and/or a combination thereof can be used to attain an application-adaptable lamp.

The emittable light becomes particularly uniform if the light sources of the at least two light source groups are assigned to one another in pairs. Being assigned to one another in pairs can here be understood to mean a pair in terms of number, in the way in which one or two or at least one light source correspond(s) to one or two or at least one respective other(s). Being assigned to one another in pairs can also be understood to mean a set which is balanced in terms of luminous flux, in the way in which, for example, two light sources of one color having a weak luminous flux correspond to a light source of another color having a strong luminous flux.

When the lamp is replaceable and/or standardized, serial production can attain a greater number of units, with the result that process reliability—for example of a production process—can increase.

The lamp may include an instruction interface so that instructions are transmittable to the lamp from a separate control device. The lamp can consequently be incorporated in a for example centrally determined light scenario, such as a turn light. If the lamp includes an instruction interface and the lamp is configured to control at least the light sources of the at least two light source groups in accordance with at least one instruction, the same advantage can be attained.

The lamp may include a sensor interface so that the lamp can react to a sensor signal. A sensor can sense or measure the lamp, for example an emitted color shade or a lit image, or it can sense or measure a variable that triggers and/or influences a light scenario, e.g. a steering wheel angle. The same effect can be attained if the lamp includes a sensor interface and the lamp is configured to control at least the light sources of the at least two light source groups in accordance with at least one sensor signal. In this case, controlling a light source of the at least one light source group may also include not controlling and/or not activating and/or not state-changing a control of at least one light source.

An application-adaptable lamp may include an instruction interface and/or a sensor interface and can be configured to control at least the light sources of the at least two light source groups in accordance with at least one instruction and/or in accordance with at least one sensor signal. It is possible, for example, that a sensor captures a sensor signal which should be specified or specifiable to entail a color point shift, and that this sensor signal then is processed, by way of an external control unit, such as a body control unit of a vehicle, into an instruction that can be supplied to the lamp. For example, it is possible that a sensor captures a sensor signal which should be specified or specifiable to entail a color point shift, and that this sensor signal can then be supplied directly to the lamp and be processed by said lamp.

One input into the lamp that could entail a color point shift can be an autonomy level change or an autonomy level change of an autonomously driving vehicle, such as switching from stop-and-go traffic without human intervention to non-autonomous urban traffic. An autonomous vehicle is, for example, a vehicle or road user which is controlled by a sensor system and a control unit independently of, with level-based independence of and/or partially or temporarily independently of a person.

The lamp may include a storage unit, which means that type-specific information, such as a lighting characteristic, and/or individually determined information, such as a manufacturing-dependent luminance, and/or general information, such as physical constants, and/or also variable information, such as a number of operating hours, are storable or savable. The same effect is attainable if the lamp includes a storage unit and the lamp is configured to control at least the light sources of the at least two light source groups in accordance with information which is stored and/or storable in the storage unit.

The lamp can include, in addition to the instruction interface, the sensor interface and/or the storage unit, a heat sink, a locking apparatus, an energy interface and/or an energy supply, such as a driver. The lamp can include further electrical, electronic, mechanical and/or mechatronic components and/or a logic or the like.

The lamp can attain an additional use, which is desirable for convenience, if it is configured to control a coming-home function and/or a leaving-home function and/or a warning function and/or a non-ECE-compliant function by way of the light sources that are prepared to emit blue light. In what is known as a coming-home function, the driver is greeted by a light effect for example upon turning the vehicle ignition on or off, for example when starting the vehicle or parking in a garage. A leaving-home function can be implemented as a greeting light effect as a reaction to a e.g. remotely actuated unlocking of a vehicle. In a further development, a device for detecting a non-public road space, such as GPS, and/or an image recognition device and/or a radio receiver and/or a contour detection device, such as LIDAR and/or RADAR, can be provided in a manner such that it is connected in a communicating fashion to the lamp in order to observe any existing regulatory provisions. Said devices can also be connected and/or provided so as to be connectable to the lamp for other purposes, for example for detecting whether a vehicle is moving within a built-up area or outside it or for detecting a driving velocity.

A warning function may include, for example, that a vehicle identifies a warning signal of an approaching emergency vehicle, such as an ambulance, and optionally passes on said warning signal by flashing synchronously so as to warn other vehicles. A warning function may include, for example, that a vehicle identifies by way of a distance sensor, such as a LIDAR, a situation in which it is approaching a traffic jam and e.g. autonomously warns other road users.

The lamp can comply with a regulation and thus be used for example as the single front lamp of a vehicle if the lamp is configured, for example, to emit a standardized ECE white field for automotive applications using the light sources which are prepared for emitting white light, or if the lamp is configured to emit, using the light sources which are prepared for emitting blue light and the light sources which are prepared for emitting yellow light, e.g. in wavelength-superposing fashion, light having a color point that is located within the standardized ECE white field for automotive applications. The lamp can here be configured to fulfill an illumination function such as a turn light function and/or a fog light function and/or a low-beam function and/or a high-beam function and/or a combination and/or modification (for example adaptive driving beam (ADB) or adaptive frontlighting system (AFS)) of said functions and further functions. For example, AFS is used during the low-beam function and can offer controlled-access highway light and/or bad-weather light and/or urban-area light. ADB may be used during high-beam light and can provide glare-free high-beam light. An ECE standardized white field can have e.g. the color temperature 3000 K or 6000 K.

If the lamp is configured to control a color point shift of emitted light using the at least two light source groups during the operation according to and/or proportionally to a state variable, it is also possible to attain an additional use which is desirable for convenience. The state variable can be a degree of visibility during fog, and/or it can be a driving speed, and/or it can be a specified variable, and/or it can be a position, such as a position within a built-up area, a position outside a built-up area or a position in a country with specific color point regulations.

The lamp can be prepared for use in a vehicle. A vehicle can be an aircraft or a watercraft or a land vehicle. The land vehicle can be a motor vehicle or a rail vehicle or a bicycle. In various embodiments, the vehicle is a truck or a passenger car or a motorcycle. The vehicle can furthermore be configured as a non-autonomous or partially autonomous or autonomous vehicle. The lamp, in a development, can be prepared to be used in a vehicle which is designed according to the standards of the automotive industry in order to be adapted particularly to this relatively specific intended purpose. This suitability can manifest itself, for example, in that all functional parts are designed for the temperature range from −40 to +125° C. Even though the examples in this description frequently include references to a vehicle, the lamp can also be prepared for other applications, such as stationary applications, for example effect light illumination, entertainment illumination, architainment illumination, ambient illumination, medical and therapeutic illumination, illumination for horticulture etc.

Also independently claimable are a headlamp with a lamp as described above, a vehicle having a headlamp with a lamp as described above, and/or a vehicle having a lamp as described above. The headlamp or the vehicle includes the effects of the respective lamp.

Figure 1:
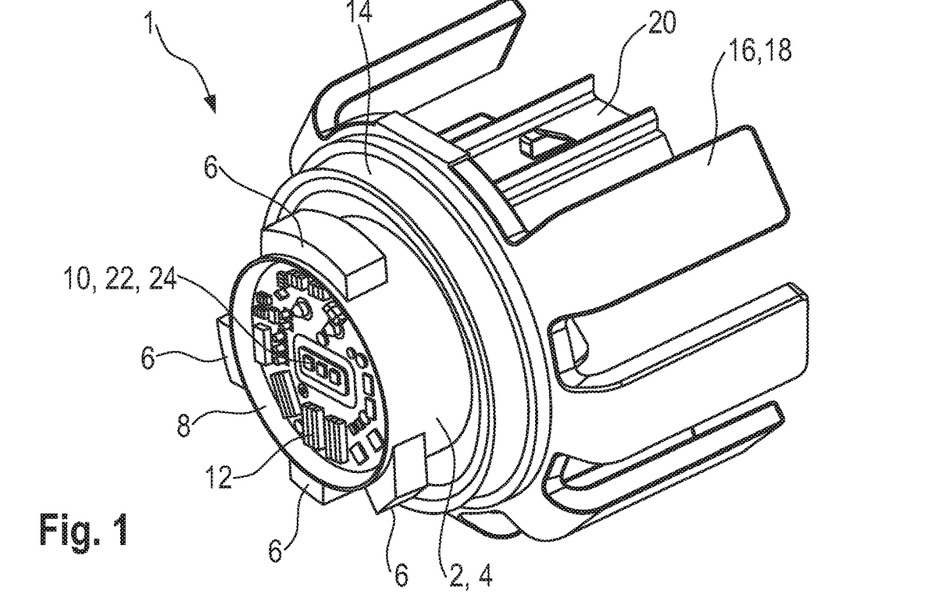
FIG. 1 shows a perspective schematic illustration of a lamp in accordance with a first embodiment.

FIG. 1 illustrates a for example replaceable and standardizable lamp 1 in accordance with a first embodiment. The lamp 1 is combinable with a socket (not illustrated) of a headlamp (not illustrated in more detail). The headlamp can be used as a tail light, signal light, position light, turning light, brake light, accent light, but also as fog light, daytime running light, low-beam and/or high-beam function or the like of a vehicle (not illustrated).

The lamp 1 has a base 2. The lamp 1 may be fastened to the socket by way of the base 2. The base 2 has an approximately circular-cylindrical outer lateral surface 4, from which four key tabs 6 extend radially.

The term "approximately" can mean, for example, that a deviation in the tolerances which are typical in the art, or of up to 5%, can be provided.

On the end side, the base 2 has a circular-cylindrical cutout 8, in which light sources 10 and electronics components 12 are arranged. The electronics components 12 include (without further identification) an instruction interface, a sensor interface, a storage unit, an energy supply, which has a respective driver that is assigned to a light source 10 and has a respective pulse width modulation device, and a control unit or lamp control unit.

The light sources 10 are arranged for producing collectively emittable light. They are thus arranged in the present case next to one another to emit light in a common main emission direction.

At a distance from the key tabs 6, the base 2 is surrounded by a sealing ring 14. Furthermore, a heat sink 16 extends from the base 2. Said heat sink has a multiplicity of cooling fins 18, which extend axially away from the base 2 in the opposite radiation direction to radiation that is emitted by the light sources 10. The cooling fins 18 here surround a connection 20 for the lamp 1, which is prepared for the electrical contact.

The socket, which is part of the headlamp, has a key opening (not illustrated), in which a multiplicity of key cutouts (not illustrated) are formed. These cooperate with the key tabs 6, in that the key tabs 6 have a mating shape with respect to the key cutouts viewed in cross section (axial cross section) with respect to a main axis (not illustrated) of the base 2 and the socket. The key cutouts and the key opening and the outer lateral surface 4 and the key tabs 6 cooperate as a for example standardizable bayonet lock to facilitate replacement.

The light sources 10 are light-emitting diodes (LEDs), and they are divided into a first light source group 22 with LEDs 10 which are configured to emit yellow light, in short also referred to as the "yellow light source group" 22, and into a second light source group 24 with LEDs 10 which are configured to emit blue light, in short also referred to as the "blue light source group" 24.

The LEDs 10 can also be referred to as emitters, light generators and/or light-emitting elements. In the present case, three LEDs 22, 24 are present. The light sources 10 in the present case are respectively individually controllable and dimmable. The lamp control unit can be used to control the individually controllable light sources 10, collectively also individual light sources 10, as at least one subset and/or together. A subset can be a portion of the light sources 10 that is constructively specified via a circuit or a portion of the light sources 10 that is variable depending on the situation or on an instruction. A subset can correspond to a light source group 22, 24. A plurality of subsets are or may be connected in parallel and/or in a cascade and/or in a hierarchy. A parallel subset connection may mean that a light source 10 is actuable in a plurality of mutually independently controllable, e.g. activable and/or deactivable, subsets. A cascading subset may mean that a subset is divided or dividable again into subsets and each of said subsets is actuable. A hierarchical subset connection may mean that in the case of overlaps of subsets with contradictory switch states, one subset is given a dominant role, for example to satisfy safety requirements.

In this respect, respective light-source-individual values and at least one light-source-type value are stored in the storage unit as information, and the lamp 1 is furthermore configured to control the light sources 10 in accordance with the information stored in the storage unit. The control unit in the present case is also addressable via the instruction interface and also via the sensor interface.

In the following description of FIG. 2 to FIG. 11, for a symbolically simplified illustration, the light sources 10 of the yellow light source group 22 are illustrated as empty squares and the light sources 10 of the blue light source group 24 as hatched squares. Each embodiment can be varied by swapping the blue and yellow light sources without this being described again below. The figures belonging to the following description show, in addition to the light sources 10 and the light source groups 22, 24, possibly an axis of mirror symmetry 26, an offset direction 28, a pair 30 of differently colored light sources 10, a circle 32 between light source groups having a mutually concentric and radially different arrangement and/or a radial offset direction 34. The light sources 10 of the light source group 22 can here have a different area (emission surface) than the light sources 10 of the light source group 24. This is also true for all embodiments that follow.

Figure 2:
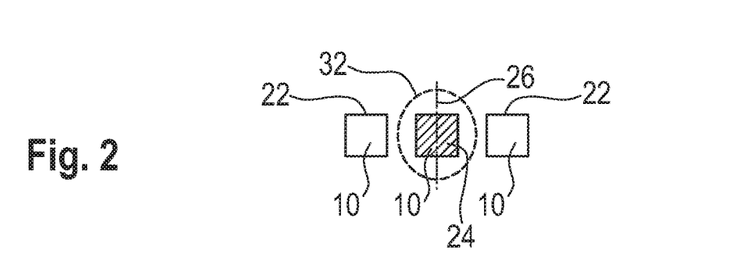
FIG. 2 shows a schematic plan view of a light source arrangement of the lamp in accordance with the first embodiment.

FIG. 2 shows the arrangement of the light sources 10 in accordance with the first embodiment. In the present case, the yellow light source group 22 includes two light sources 10 and, as a different number, the blue light source group 24 includes one light source 10. The light sources 10 of the yellow light source group 22 and the light source 10 of the blue light source group 24 are arranged along a common line with an offset in a manner such that the yellow light sources 10 each neighbor the blue light source 10. An axis of mirror symmetry 26 extends transversely through the blue light source 10. The arrangement is point symmetric with respect to the blue light source 10. As is indicated by the circle 32, the arrangement is rotationally symmetric around the blue light source 10 at an angle of approx. 180°.

Figure 3:
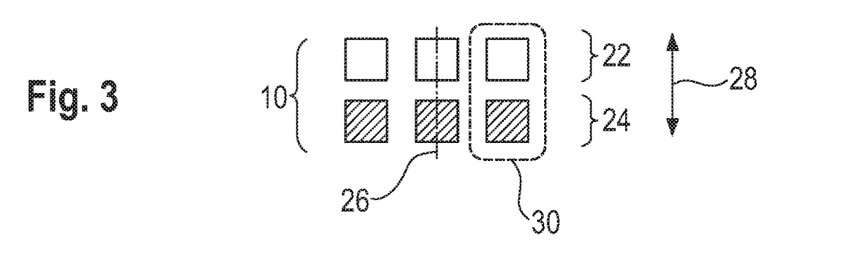
FIG. 3 shows a schematic plan view of a light source arrangement of a lamp in accordance with a second embodiment.

FIG. 3 shows the arrangement of the light sources 10 in accordance with a second embodiment. In the present case, the light source groups 22, 24 include, in identical numbers, three light sources 10 each. The light sources 10 of the light source groups 22, 24 are arranged in each case along a line, wherein the lines are approximately parallel or offset with respect to one another, with the result that each light source 10 is neighbored by one differently colored and one or two same-colored light sources 10. An axis of mirror symmetry 26 extends transversely through in each case the central yellow and blue light sources 10. A pair 30 of mutually assigned differently colored light sources 10 is indicated by way of example.

Figure 4:
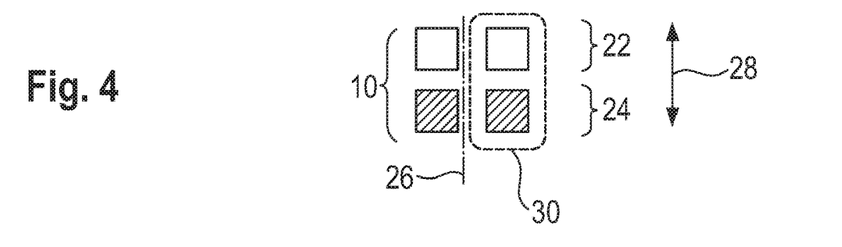
FIG. 4 shows a schematic plan view of a light source arrangement of a lamp in accordance with a third embodiment.

FIG. 4 shows the arrangement of the light sources 10 in accordance with a third embodiment. In the present case, the light source groups 22, 24 include, in identical numbers, two light sources 10 each. The light sources 10 of the light source groups 22, 24 are arranged in each case along a line, which lines are approximately parallel or offset with respect to one another, with the result that each light source 10 is neighbored by one differently colored and by one same-colored light source 10. An axis of mirror symmetry 26 extends between the blue and between the yellow light sources 10. A pair 30 of mutually assigned differently colored light sources 10 is indicated by way of example.

Figure 5:
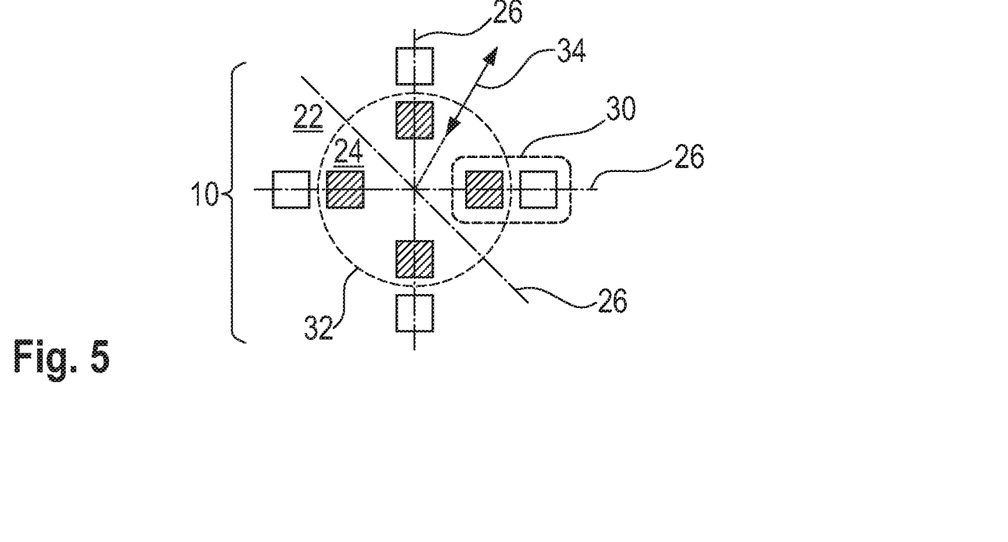
FIG. 5 shows a schematic plan view of a light source arrangement of a lamp in accordance with a fourth embodiment.

FIG. 5 shows the arrangement of the light sources 10 in accordance with a fourth embodiment. In the present case, the light source groups 22, 24 include, in identical numbers, four light sources 10 each. The light sources 10 of the light source groups 22, 24 are arranged along mutually concentric circles of different radii in a manner such that each light source 10 is neighbored by one differently colored light source 10 with a radial offset and two same-colored light sources 10 with a circumferential offset. One respective axis of mirror symmetry 26 extends such that it crosses two yellow and two blue light sources 10, and one extends as a bisector between four blue and yellow light sources 10 in each case, which means there are three axes of mirror symmetry 26 here. The arrangement is point symmetric with respect to the centerpoint. A pair 30 of mutually assigned differently colored light sources 10 is indicated by way of example.

Figure 6:
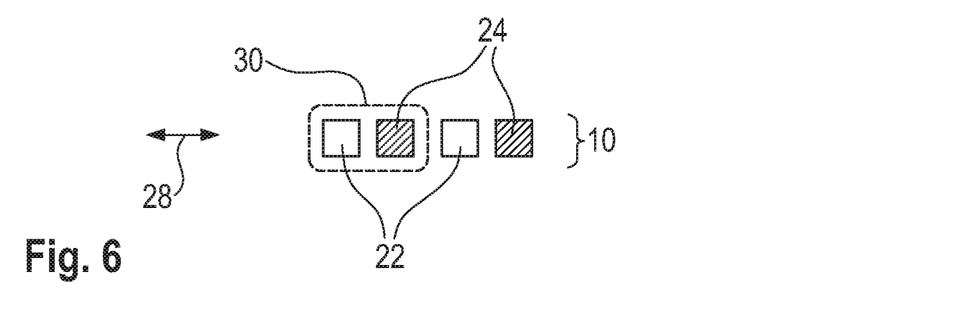
FIG. 6 shows a schematic plan view of a light source arrangement of a lamp in accordance with a fifth embodiment.

FIG. 6 shows the arrangement of the light sources 10 in accordance with a fifth embodiment. In the present case, the light source groups 22, 24 include, in identical numbers, two light sources 10 each. The light sources 10 of the yellow light source group 22 and the light sources 10 of the blue light source group 24 are arranged along a common line with an offset in a manner such that each light source 10 is neighbored by one or two differently colored light sources 10. A pair 30 of mutually assigned differently colored light sources 10 is indicated by way of example.

Figure 7:
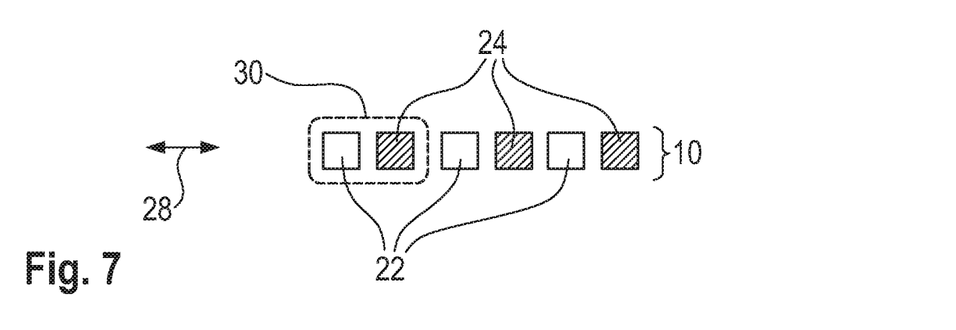
FIG. 7 shows a schematic plan view of a light source arrangement of a lamp in accordance with a sixth embodiment.

FIG. 7 shows the arrangement of the light sources 10 in accordance with a sixth embodiment. In the present case, the light source groups 22, 24 include, in identical numbers, three light sources 10 each. The light sources 10 of the yellow light source group 22 and the light sources 10 of the blue light source group 24 are arranged along a common line with an offset in a manner such that each light source 10 is neighbored by one or two differently colored light sources 10. An axis of mirror symmetry 26 extends between the central yellow and the central blue light source 10. A pair 30 of mutually assigned differently colored light sources 10 is indicated by way of example.

Figure 8:
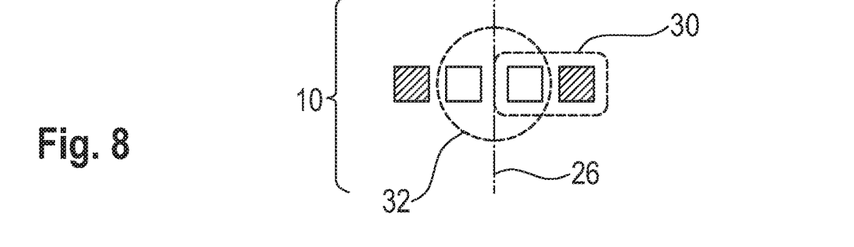
FIG. 8 shows a schematic plan view of a light source arrangement of a lamp in accordance with a seventh embodiment.

FIG. 8 shows the arrangement of the light sources 10 in accordance with a seventh embodiment. In the present case, the light source groups 22, 24 include, in identical numbers, two light sources 10 each. The light sources 10 of the yellow light source group 22 and the light sources 10 of the blue light source group 24 are arranged along a common line with an offset in a manner such that one yellow light source 10 is in each case neighbored by a blue and a yellow light source 10. An axis of mirror symmetry 26 extends between the yellow light sources 10. The arrangement is point symmetric with respect to a centerpoint. A pair 30 of mutually assigned differently colored light sources 10 is indicated by way of example. As is indicated by the circle 32, the arrangement is rotationally symmetric around the blue light source 10 at an angle of approx. 180°.

Figure 9:
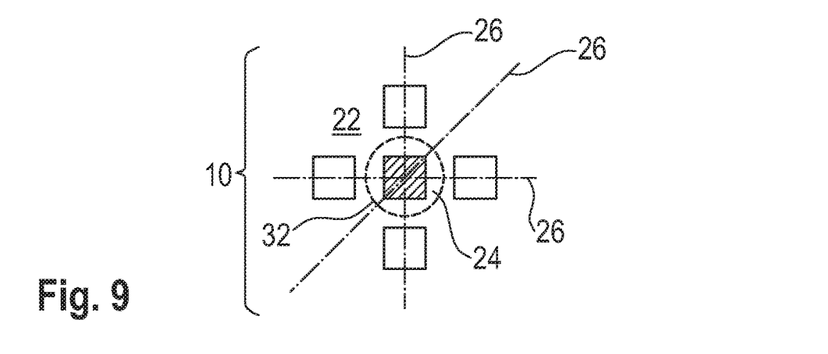
FIG. 9 shows a schematic plan view of a light source arrangement of a lamp in accordance with an eighth embodiment.

FIG. 9 shows the arrangement of the light sources 10 in accordance with an eighth embodiment. In the present case, the yellow light source group 22 includes four light sources 10 and, as a different number, the blue light source group 24 includes one light source 10. The light sources 10 of the yellow light source group 22 are arranged with an angle offset along a circle 32 around the blue light source 10. An axis of mirror symmetry 26 extends such that it crosses in each case two yellow light sources 10 and the blue light source 10, or extends as a bisector between the yellow light sources 10 and such that it crosses the blue light source 10, which means there may be three axes of mirror symmetry 26 here. The arrangement is point symmetric with respect to the blue light source 10.

Figure 10:
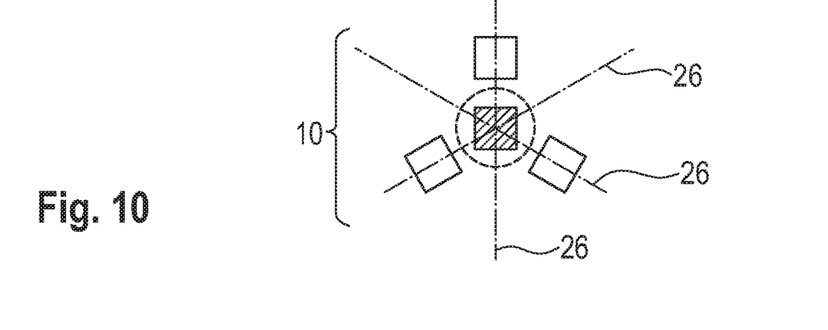
FIG. 10 shows a schematic plan view of a light source arrangement of a lamp in accordance with a ninth embodiment.

FIG. 10 shows the arrangement of the light sources 10 in accordance with a ninth embodiment. In the present case, the yellow light source group 22 includes three light sources 10 and, as a different number, the blue light source group 24 includes one light source 10. The light sources 10 of the yellow light source group 22 are arranged with an angle offset along a circle 32 around the blue light source 10. In each case one axis of mirror symmetry 26 extends such that it crosses one of the yellow light sources 10 and the blue light source 10.

Figure 11:
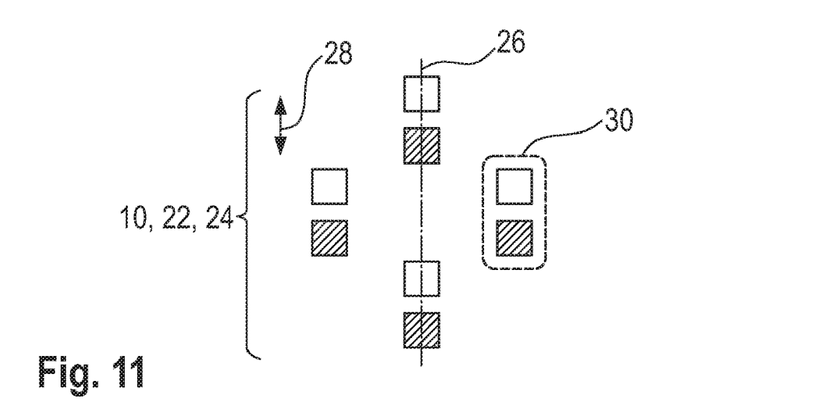
FIG. 11 shows a schematic plan view of a light source arrangement of a lamp in accordance with a tenth embodiment.

FIG. 11 shows the arrangement of the light sources 10 in accordance with a tenth embodiment. In the present case, the light source groups 22, 24 include, in identical numbers, four light sources 10 each. The light sources 10 of the yellow light source group 22 are arranged in accordance with a geometric pattern, in the present case a rhombus, and the light sources of the blue light source group 24 are arranged in accordance with an identically shaped pattern which is offset linearly in the offset direction 28. One axis of mirror symmetry 26 extends such that it crosses the two yellow and two blue light sources 10 that are situated in an extension with respect to one another. One pair 30 of mutually assigned differently colored light sources 10 is indicated.

The above-described embodiments have in common that yellow light is emittable via the light sources 10 of the light source group 22 which are prepared or configured to emit yellow light, that blue light is emittable via the light sources 10 of the light source group 24 which are prepared or configured to emit blue light, and that white light is emittable collectively or as a mixture via the light sources 10 of the light source group 22 which are prepared or configured to emit yellow light and the light sources 10 of the light source group 24 which are prepared or configured to emit blue light. Each of the aforementioned embodiments can be varied such that the light sources 10 of the light source group 24 are prepared or configured to emit white light.

LIST OF REFERENCE SIGNS lamp 1
base 2
outer lateral surface 4
key tab 6
cutout 8
light source 10
electronics component 12
sealing ring 14
heat sink 16
cooling fin 18
connection 20
light source group 22
light source group 24
axis of mirror symmetry 26
offset direction 28
pair 30
circle 32
offset radius 34

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lamp for a headlamp, the lamp comprising:
   at least two light source groups each including at least one controllable light source;
   wherein the light sources of one light source group are set up for emitting yellow light;
   wherein the light sources of another light source group are set up for emitting at least one of white or blue light;
   wherein at least the light sources of the at least two light source groups are arranged for producing light that is collectively emittable;
   further comprising a control unit;
   wherein the lamp is configured to control at least the light sources of the at least two light source groups using the control unit;
   wherein the light sources of the one light source group are controllable as a first subset and the light sources of the another light source group are controllable as a second subset; and
   further comprising a storage unit containing a non-volatile stored information;
   wherein the control unit is configured to control at least the light sources of the at least two light source groups in accordance with the stored non-volatile information in the storage unit;
   wherein the lamp further comprises a sensor interface configured to receive at least one sensor signal; and
   wherein the control unit is configured to control at least the light sources of the at least two light source groups in accordance with the at least one sensor signal;
   wherein the lamp is configured to control a color point shift of emitted light using the at least two light source groups during the operation at least one of according to or proportionally to a state variable;
   wherein the state variable comprises a parameter indicative of at least one of a degree of visibility during fog, a driving speed, or a vehicle position.

2. The lamp of claim 1,
   wherein a subset of the light sources is at least one of:
   a subset of all light sources; or
   a subset of the light sources of the at least two light source groups; or
   a subset of one light source group; or
   a predetermined subset; or
   a variable subset; or
   a spatially determinable subset; or
   in each case a light source from the at least two light source groups; or
   a multiple thereof; or
   a combination thereof.

3. The lamp of claim 1,
   wherein the light sources are controllable at least one of:
   via feedback; or
   via a light-source-individual value; or
   via a light-source-type value; or
   directly.

4. The lamp of claim 1, wherein a controllable light source comprises a dimmable light source.

5. The lamp of claim 4,
   wherein for dimming purposes at least one of a device for pulse width modulation or a device for changing the current is provided.

6. The lamp of claim 1, wherein the light sources of the at least two light source groups are arranged with respect to one another to be at least one of:
   at least partially mirror symmetric; or
   regionally mirror symmetric; or
   sectionally mirror symmetric; or
   rotation symmetric; or
   asymmetric; or
   functionally offset; or
   concentrically offset; or
   angle offset; or
   a multiple thereof; or
   a combination thereof is the case.

7. The lamp of claim 1, wherein the light sources of the at least two light source groups are assigned with respect to one another in pairs.

8. The lamp of claim 1, wherein the lamp is at least one of replaceable or standardized.

9. The lamp of claim 1,
   wherein the lamp further comprises an instruction interface; and
   wherein the lamp is configured to control at least the light sources of the at least two light source groups in accordance with at least one instruction.

10. The lamp of claim 1,
    wherein the lamp is configured to control at least one of:
    a coming-home function; or
    a leaving-home function; or
    a warning function; or
    a non-ECE-compliant function by way of the light sources that are prepared to emit blue light.

11. The lamp of claim 1,
    wherein the lamp is configured to emit, using the light sources which are prepared to emit white light, light having a color point that is located within the standardized ECE white field for automotive applications.

12. The lamp of claim 1, wherein the light sources of the at least two light source groups are arranged with respect to one another to be linearly offset.

13. The lamp of claim 1, wherein the light sources of the at least two light source groups are arranged on a common substrate in a linear array approximately co-linear with respect to one another.

14. The lamp of claim 13, wherein the light sources of the at least two light source groups are interleaved with respect to one another.

15. The lamp of claim 12, wherein the light sources of the at least two light source groups are arranged on a common substrate in a linear array approximately co-linear with respect to one another.

16. The lamp of claim 15, wherein the light sources of the at least two light source groups are interleaved with respect to one another.

17. The lamp of claim 1, wherein the state variable comprises a parameter chosen from the group of parameters consisting of the degree of visibility during fog, the driving speed, and the vehicle position.

* * * * *